3,354,049
DRY STARTER COMPOSITION
Verle W. Christensen, Madison, Wis., assignor to Marschall Dairy Laboratory, Inc., Madison, Wis., a corporation of Wisconsin
No Drawing. Filed July 30, 1965, Ser. No. 476,141
11 Claims. (Cl. 195—100)

ABSTRACT OF THE DISCLOSURE

A dry lactic acid-producing starter medium is disclosed which comprises a mixture of nonfat milk powder and from about 10 to about 22.5 weight percent of a mixture of ammonium orthophosphates and alkali metal orthophosphates wherein the ammonium orthophosphates are the major constituent of the phosphate mixture.

---

This application is a continuation-in-part of my copending application Ser. No. 339,358, filed Jan. 22, 1964, now abandoned.

This invention relates to lactic acid-producing starter media which are useful in the manufacture of cheese and other cultured milk products. More particularly, the invention relates to dry lactic acid-producing starter media useful in the manufacture of cheese and other cultured milk products in which the development of bacteriophage is inhibited.

The development of bacteriophage in milk starters is a serious problem in the dairy industry since the baceteriophage is active against the lactic acid bacteria and frequently destroys the bacteria in such media before sufficient lactic acid is produced in the product with the result that the starter medium fails in is primary function. As would be expected, much attention has been given to this problem by those concerned therewith. For example, U.S. Patent No. 3,041,248 dated June 26, 1962 discusses in considerable detail the bacteriophage problem and describes a method for preparing a bacteriophage-growth resistant lactic acid-producing medium. The patented process involves adding to whole milk, skim milk or reconstituted skim milk solutions of certain phosphate salts. The phosphate salts are employed in amounts ranging from about 1 to 3% by weight of the milk and are selected so as to provide a pH in the mixture of from about 6.3 to 6.9. The milk is warmed prior to the incorporation of the phosphate salts and after addition of the phosphates must be heated to from 80 to 100° C. for at least 15 minutes, preferably from about 15 to 30 minutes, to produce a milk medium resistant to the development of bacteriophage. The so-produced milk medium is cooled to a suitable temperature and inoculated with lactic acid bacteria.

The preparation and use of liquid solutions of the phosphate salts and heating the milk medium as taught in this prior art patent have been found in actual practice to require considerable personal attention and to be time consuming. As a result of these drawbacks, this patented process has not found universal acceptance in the dairy industry as a means for overcoming bacteriophage development in milk starters. Furthermore, a starter medium in dry or solid form is much more advantageous from the standpoint of convenience in shipping, handling, storage, use and so forth. The major difficulty which has heretofore prevented the production of satisfactory bacteriophage-inhibited starter compositions in dry form is the tendency of the milk protein to precipitate when the medium is mixed with wtaer and subjected to heat sterilization.

It is an object of this invention to provide dry lactic acid-producing starter media useful in the manufacture of cultured milk products in which the development of bacteriophage is inhibited.

It is another object of this invention to provide lactic acid-producing starter media in the form of a dry powder which can be readily dissolved in water and utilized with significant advantages for coagulation of milk.

A further object of this invention is to provide bacteriophage-inhibited lactic acid-producing starter media in the form of a dry powder which can be readily dissolved in water and subjected to heat without undue precipitation of solids from solution.

The lactic acid-producing starter compositions of this inventon comprise essentially nonfat milk powder and regulated amounts of certain dry phosphate salts. Dry phosphate salts are employed in the lactic acid-producing starter compositions of the invention in order to inhbit or control bacteriophage development. We have found that the types and amounts of the phosphate salts employed must be controlled in order to provide a highly prolific dry starter medium which does not tend to precipitate on heating and in which bacteriophage proliferation is prevented.

Specifically, the phosphate salts which are employed in the compositions of the present invention comprise a mixture of an ammonium orthophosphate and an alkali metal orthophosphate, preferably sodium or potassium orthophosphate or mixtures thereof. The use of the mixture of the ammonium orthophosphate salts and the alkali metal phosphates is very important in obtaining a satisfactory starter composition in dry form. Contamination of the orthophosphate salts with pyrophosphate salts is to be avoided in order to reduce the possibility of undesired precipitation of protein when the dry starter composition is mixed with water.

The total amount of orthophosphate salts, including the ammonium orthophosphate salts and an alkali metal orthophosphate salt, employed in the compositions of the invention ranges from about 10 to about 22.5% by weight of the dry composition. In general, it is preferred to employ a maximum amount of an ammonium orthophosphate which when combined with an alkali metal orthophosphate provides in water solution a pH of from about 6.4 to 6.9. To achieve this pH, the ratio of primary and secondary orthophosphate salts can be suitably adjusted so as to permit the use of maximum amounts of an ammonium orthophosphate salt which can be either a primary, secondary or tertiary salt such as monoammonium or diammonium orthophosphate.

Preferably, the weight of the ammonium orthophosphate is greater than the alkali metal orthophosphate and most preferably is at least 2:1 or more on a weight basis. A particularly preferred combination of orthophosphate salts comprises a mixture of about 5.1% monoammonium orthophosphate, about 5.1% diammonium orthophosphate and about 5.1% disodium orthophosphate. This particularly preferred mixture of phosphate salts provides sufficient phosphate concentration to control effectively bacteriophage development and contains a sufficient amount of an ammonium orthophosphate for good culture activity. Furthermore, the amount of disodium orthophosphate is sufficient to provide a desired pH in solution and to prevent protein precipitation.

In addition to the basic ingredients of the starter composition defined above, that is a nonfat milk powder and from about 10 to about 22.5% by weight of a mixture of orthophosphate salts, there can be incorporated in the compositions of the invention other materials which confer definite advantages. Thus, representative preferred compositions of this type comprise dry mixtures of the following ingredients in the weight percentages specified:

|  | Broad Operable Range | Preferred |
|---|---|---|
| Nonfat Milk Powder | 40 to 90 | 67.5 |
| Mixture of Phosphate Salts (Total) | 10 to 22.5 | 15.3 |
| Demineralized Whey Powder [1] | 0 to 50 | 17.0 |
| Dry Pancreas Extract [1] | 0 to 1.5 | 0.2 |
| Lactose [1] | 0 to 20 |  |
| Dextrose [1] | 0 to 45 |  |

[1] In lieu of part of nonfat milk powder.

The dry extract of pancreas gland, when employed in amounts up to 1.5% by weight of the composition, advantageously stimulates growth of the lactic acid-producing bacteria. Dry extracts of pancreas gland are, of course, well known in the art and are commercially available.

The use of demineralized whey powder in lieu of a part of the nonfat milk powder significantly reduces the level of calcium and other divalent metals which would otherwise be present in the composition and as a result lower levels of phosphate salts are required to control the bacteriophage. Furthermore, the whey powder contains no casein, thereby reducing the possibility of casein precipitation in use. On the other hand, a large proportion of nonfat dry milk powder is required in the starter composition to achieve luxuriant growth of the lactic acid bacteria. Moreover, the milk powder possesses the property of forming a gel as growth of the bacteria proceeds and this phenomenon can be advantageously used to indicate the extent of bacteria development.

Particularly preferred compositions in accordance with the invention are as follows:

|  | Formulation A, percent by weight | Formulation B, percent by weight |
|---|---|---|
| Nonfat milk powder | 67.5 | 51.0 |
| Demineralized whey powder | 17.0 | 16.9 |
| Dried extract of pancreas powder | 0.2 | 0.2 |
| Monoammonium phosphate | 5.1 | 3.8 |
| Diammonium phosphate | 5.1 | 4.8 |
| Disodium phosphate | 5.1 | 6.5 |
| Lactose |  | 16.8 |

In a particularly preferred embodiment of the invention not substantially more than 30% of the nonfat dry milk powder is smaller than 100 mesh particle size nor substantially more than 10% of the powder larger than 50 mesh. Most preferably, the particle size distribution of the nonfat milk powder is such that at least 80% thereof is between 50 and 100 mesh, U.S. sieve series. The particle size of the nonfat milk powder is very important in formulating the starter compositions of this invention. When the amount of nonfat milk powder having a particle size smaller than about 100 mesh exceeds about 30%, it is difficult to achieve the rapid solubilization in water by merely adding the composition to water and mixing; rapid solubilization being necessary to insure protein stabilization during cooking of the starter media. On the other hand, preferably not substantially more than 10% of the nonfat milk powder is larger than 50 mesh or it is difficult to obtain uniform mixing of all of the ingredients. Non-uniform mixing of the ingredients results in localized areas where the phosphate concentration becomes too high, which in turn causes precipitation of the protein during cooking.

In utilizing the preferred starter compositions of the invention wherein the nonfat milk powder has a particle size of from about 50 to 100 mesh, the dry powder is stirred into water, generally in an amount ranging from about 10 to about 12.5%. The mixture is then heated to a temperature of about 180° to 200° F. for from 30 to 60 minutes or for 10 minutes under 10 pounds per square inch steam pressure. Heating can be accomplished in any suitable manner employing such expedients as heating with steam in an autoclave and the like. The medium is then cooled to a temperature suitable for inoculation in conventional manner with lactic acid bacteria such as 90° F. or below. After inoculation the starter medium is incubated at a temperature from 70° to 88° for 6 to 16 hours, preferably a temperature of 71–73° for 14–16 hours is used, after which it is ready for use in the production of cheese and other cultured milk products.

The data in Table I below indicates the importance of the particle size of the nonfat milk powder if the dry starter composition is merely added to water with agitation and without employing a more sophisticated dissolving technique such as instantizing, etc.

TABLE I

| Screen Size | Nonfat Milk Powder A, Percent | Nonfat Milk Powder B, Percent | Nonfat Milk Powder C, Percent | Nonfat Milk Powder D, Percent | Nonfat Milk Powder E, Percent |
|---|---|---|---|---|---|
| On 35 |  | 0 | 0 | 2.2 | 0 |
| On 48 | 0 | 1.1 | 0 | 12.2 | 0 |
| On 65 | 8.8 | 6.5 | 0 | 52.2 | 35 |
| On 80 | 10.9 | 8.6 | 0 | 14.4 | 11 |
| On 100 | 13 | 16.2 | 0 | 5.5 | 19 |
| On 200 | 43.5 | 51 | 16 | 11.1 | 26 |
| Thru 200 | 23.9 | 17.2 | 84 | 2.2 | 6 |
| Precipitation after heating | Yes | Yes | Yes | No | Slight |

When the particle size of the nonfat milk powder is outside the range specified in the preferred embodiment of the invention, difficulty may be encountered in satisfactorily dissolving the dry starter composition to obtain a rapid solubilization. In such instances more sophisticated techniques can be employed to facilitate dissolution of the starter composition. For example, when the particle size of the nonfat milk powder is substantially smaller than 100 mesh, U.S. sieve series, the starter composition can be subjected to an "instantizing" process to agglomerate the fine particles into a size which permits rapid dissolution in water with reasonable agitation. Generally, the instantizing process should provide a product having a particle size of from 50 to 100 mesh. The instantized product can then be rapidly dissolved in water as indicated above. Various instantizing techniques are well known in the dairy industry to accomplish, for example, agglomeration of fine particles of nonfat milk powder into a size which permits rapid dissolution in water and milk. One of the most common instantizing techniques involves wetting and redrying of the small particles so as to cause agglomeration thereof.

Alternatively, rather than resort to use of an instantizing process, rapid solubilization of the dry starter composition can be achieved by employing a powder funnel dissolving technique which is also well known in the dairy industry. In these powder funnel dissolving techniques a powder horn is employed to discharge dry particles through a relatively restricted orifice into a violently moving stream to gain quick wettability of the powder. After dissolution of the dry starter composition by whatever means the heating and inoculation is carried out as previously indicated.

The starter compositions of this invention can also include useful ingredients other than those specified herein such as, for example, sucrose, dextrose and other well-known growth nutrients for the lactic acid-producing bacteria.

Specific advantages of the novel lactic acid starter media compositions of this invention are:

(1) Exceptional ability to inhibit development of bacteriophage in general including bacteriophage of the type generally considered most difficult to control;

(2) Convenience in use with the powdered composition being readily soluble in water;

(3) High stimulatory activity with respect to the growth of lactic acid-producing bacteria, the starter compositions of the invention commonly providing 25 to 50% more viable bacterial cells than are obtained with prior art milk medium starter cultures;

(4) Significant reduction in the amount of the starter composition required due to the exceptional bacteria stimulating activity; and (5) Uniform starter activity with production of high quality cultured milk products on a uniformly consistent basis.

Those modifications and equivalents which fall within the spirit of the invention and the scope of the appended claims are to be considered part of the invention.

I claim:

1. A composition of matter comprising a substantially dry mixture of nonfat milk powder having a particle size distribution such that not more than 30% thereof passes a 100 mesh sieve and not more than 10% thereof is retained by a 50 mesh sieve U.S. sieve series, and an ammonium orthophosphate together with an alkali metal orthophosphate, the total amount of said phosphates being from about 10 to about 22.5% by weight of the composition, and the amount of ammnium orthophosphate being greater than the amunt of the alkali metal orthophosphate.

2. A composition of matter comprising a substantially dry mixture of nonfat milk powder, the major proportion of which having a particle size of from about 50 to 100 mesh U.S. sieve series, and about 5.1% monoammonium orthophosphate, 5.1% diammonium orthophosphate and 5.1% disodium orthophosphate.

3. A composition of matter comprising a substantially dry mixture of from about 40 to about 90% by weight of nonfat milk powder, the major proportion of which having a particle size of from about 50 to 100 mesh, U.S. sieve series, from about 0 to about 50% by weight of demineralized whey powder, from about 0 to about 1.5% by weight of dry pancreas extract and from about 10 to about 22.5% of a mixture of an ammonium orthophosphate and an al-alkali metal orthophosphate wherein the amount of ammonium orthophosphate is greater than the amount of alkali metal orthophosphate.

4. A composition of matter comprising a substantially dry mixture of about 67.5% by weight of nonfat milk powder, the major proportion of which having a particle size of from about 50 to 100 mesh, U.S. sieve series, about 17.0% by weight of demineralized whey powder, about 0.2% by weight of dry pancreas extract and about 15.3% of a mixture of an ammonium orthophosphate and an alkali metal orthophosphate wherein the amount of ammonium orthophosphate is greater than the amount of alkali metal orthophosphate.

5. A composition of matter comprising a substantially dry mixture of about 51.0% by weight, of nonfat milk powder, the major proportion of which having a particle size of from about 50 to 100 mesh, U.S. sieve series, about 16.9% by weight of demineralized whey powder, about 0.2% by weight of dry pancreas extract, about 15.1% of a mixture of an ammonium orthophosphate and an alkali metal ortho phosphate wherein the amount of ammonium orthophosphate is greater than the amount of alkali metal orthophosphate and about 16.8% lactose.

6. A composition of matter comprising a substantially dry mixture of nonfat milk powder and an ammonium orthophosphate together with an alkali metal orthophosphate, the total amount of said phosphates being from about 10 to about 22.5% by weight of the composition, and the amount of ammonium orthophosphate being greater than the amount of the alkali metal orthophosphate.

7. A composition of matter comprising a substantially dry mixture of nonfat milk powder and an ammonium orthophosphate together with an alkali metal orthophosphate, the total amount of said phosphates being from about 10 to about 22.5% by weight of the composition, the weight ratio of ammonium orthophosphate to the alkali metal orthophosphate being at least about 2:1.

8. A composition of matter comprising a substantially dry mixture of nonfat milk powder and about 5.1% monoammonium orthophosphate, 5.1% diammonium orthophosphate and 5.1% disodium orthophosphate.

9. A composition of matter comprising a substantially dry mixture of from about 40 to about 90% by weight of nonfat milk powder, from about 0 to about 50% by weight of demineralized whey powder, from about 0 to about 1.5% by weight of dry pancreas extract and from about 10 to about 22.5% of a mixture of an ammonium orthophosphate and an alkali metal orthophosphate wherein the amount of ammonium orthophosphate is greater than the amount of alkali metal orthophosphate.

10. A composition of matter comprising a substantially dry mixture of about 67.5% by weight of nonfat milk powder, about 17.0% by weight of demineralized whey powder, about 0.2% by weight of dry pancreas extract and about 15.3% of a mixture of an ammonium orthophosphate and an alkali metal orthophosphate wherein the amount of ammonium orthophosphate is greater than the amount of alkali metal orthophosphate.

11. A composition of matter comprising a substantially dry mixture of about 51.0% by weight of nonfat milk powder, about 16.9% by weight of demineralized whey powder, about 0.2% by weight of dry pancreas extract, about 15.1% of a mixture of an ammonium orthophosphate and an alkali metal orthophosphate wherein the amount of ammonium orthophosphate is greater than the amount of alkali metal orthophosphate and about 16.8% lactose.

References Cited

UNITED STATES PATENTS

| | | | |
|---|---|---|---|
| 2,143,359 | 1/1939 | Daly et al. | 195—48 |
| 3,041,248 | 6/1962 | Hargrove | 195—48 |

FOREIGN PATENTS

| | | |
|---|---|---|
| 237,822 | 10/1959 | Australia. |

OTHER REFERENCES

Frost, W. D. Difco Manual 8th Edition, "The Origin of Dehydrated Culture Media," 1958, page 14.

Speck et al.: Applied Microbiology 10, 496–499 (1962).

LIONEL M. SHAPIRO, *Primary Examiner.*

A. LOUIS MONACELL, *Examiner.*